United States Patent [19]
Schreiber et al.

[11] Patent Number: 5,425,050
[45] Date of Patent: Jun. 13, 1995

[54] TELEVISION TRANSMISSION SYSTEM USING SPREAD SPECTRUM AND ORTHOGONAL FREQUENCY-DIVISION MULTIPLEX

[75] Inventors: William F. Schreiber, Cambridge; Michael O. Polley, Belmont, both of Mass.

[73] Assignee: Massachusetts Institute of Technology, Cambridge, Mass.

[21] Appl. No.: 149,264

[22] Filed: Nov. 9, 1993

Related U.S. Application Data

[63] Continuation-in-part of Ser. No. 965,227, Oct. 23, 1992, Pat. No. 5,311,543.

[51] Int. Cl.$^6$ ............................................. H04N 7/167
[52] U.S. Cl. ...................................... 375/200; 380/10; 380/13
[58] Field of Search .................. 375/1; 380/10, 20, 13, 380/19

[56] References Cited

U.S. PATENT DOCUMENTS

| | | |
|---|---|---|
| 3,488,445 | 1/1970 | Chang . |
| 4,425,642 | 1/1984 | Moses et al. ............................ 375/1 |
| 4,821,120 | 4/1989 | Tomlinson ............................... 375/1 |
| 4,890,283 | 12/1989 | Tsinberg et al. ......................... 375/1 |
| 4,907,087 | 3/1990 | Schreiber ............................. 358/186 |
| 4,912,721 | 3/1990 | Pidgeon et al. .......................... 375/1 |
| 5,073,899 | 12/1991 | Collier et al. ............................ 375/1 |
| 5,127,021 | 6/1992 | Schreiber ................................. 375/1 |
| 5,311,543 | 5/1994 | Schreiber et al. ...................... 380/10 |

OTHER PUBLICATIONS

Weinstein, S. B. et al., "Data Transmission by Frequency-Division Multiplexing Using the Discrete Fourier Transform", IEEE Transactions on Communication Technology, vol. COM-19, No. 5, Oct. 1971, pp. 628–634.

Hirosaki, B., "An Orthogonally Multiplexed QAM System Using the Discrete Fourier Transform", IEEE Transactions on Communications, vol. COM-29, No. 7, Jul. 1981, pp. 982–989.

Chang, R. W., "Synthesis of Band–Limited Orthogonal Signals for Multichannel Data Transmission", The Bell System Technical Journal, Dec. 1966, pp. 1775–1796.

Pommier, D. et al., "A Hybrid Satellite/Terrestrial Approach for Digital Audio Broadcasting With Mobile and Portable Receivers", NAB Engineering Conference Proceedings, 1990, pp. 304–311.

"Description of the COFDM System", Groupement D'Interet Economique Regipar L'Ordonnance Du, Sep. 23, 1967.

Alard, M. et al., "Principles of Modulation and Channel Coding for Digital Broadcasting for Mobile Receivers", EBU Review–Technical, No. 224, Aug. 1987, pp. 168–190.

*Primary Examiner*—David C. Cain
*Attorney, Agent, or Firm*—Fish & Richardson

[57] ABSTRACT

An apparatus for encoding a television production signal for transmission, the television production signal including a first input signal carrying a first class of data and a second input signal carrying a second class of data, the second class data requiring a higher-quality transmission the first class data. For each word of the first input signal, the first stage generates N serial samples of the first output sample stream, each of the N serial samples being formed by a different combination of a set of more than one of the N samples of the each word. The second stage includes an input stage combining the second input signal stream with the first output sample stream to generate an intermediate input sample stream; a serial-to-parallel converter receiving the intermediate input sample stream and producing a second stream of words therefrom, each of the words of which being a parallel grouping of M successive samples of the intermediate input sample stream; a Discrete Fourier Transform (DFT) module producing a parallel output stream of words that is the discrete Fourier transform of the second word stream; and a parallel-to-series converter generating the FDM output signal from the parallel output stream of the DFT module.

53 Claims, 11 Drawing Sheets

TELEVISION TRANSMISSION SYSTEM USING SPREAD SPECTRUM AND ORTHOGONAL FREQUENCY-DIVISION MULTIPLEX

CROSS REFERENCE TO RELATION APPLICATIONS

This application is a continuation-in-part of U.S. patent application Ser. No. 07/965,227, filed Oct. 23, 1992, now U.S. Pat. No. 5,311,543.

FIELD OF THE INVENTION

The invention relates to television systems that make use of data compression and particularly to the transmission of coded TV signals in channels that are physically analog such as the over-the-air transmission channel. It also relates to communication systems making use of spread spectrum (SS) and orthogonal frequency-division multiplex (OFDM).

BACKGROUND OF THE INVENTION

In U.S. Pat. No. 5,127,021 (the '021 Patent) and in U.S. patent application Ser. No. 07/965,227 (the '227 Application), both of which are incorporated herein by reference, TV systems using spread spectrum were disclosed. The present invention is an improvement of the earlier inventions, providing higher resistance to channel impairments as well as the ability to be employed in single-frequency networks (SFNs).

The U.S. is in the process of developing standards for over-the-air broadcasting of high-definition television (HDTV), also called Advanced Television (ATV).

Because substantial data compression is required in order to permit transmission in the same 6-MHz channel that is used for the current system (NTSC), system proponents have proposed all-digital systems, using both digital source coding and digital channel coding. The source-coding methods are now highly developed, but the proposed channel-coding methods, which were developed for wire-line transmission, are not. The over-the-air channel is a particularly hostile environment for digital transmission, plagued as it is by multipath transmission, noise, and interference. As a result, there is considerable doubt as to whether the goals of convenience, reliability, efficient use of spectrum, and provision for a range of receivers of different price and performance will be achieved.

Cable companies are also planning to use ATV technology, but appear to be more interested in transmitting a multiplicity of programs of today's definition in each cable channel rather than transmitting one HDTV signal per channel. Cable channel characteristics are somewhat different from those of the over-the-air channel, but many of the same problems are present. The need to serve a range of receivers of different price/performance is common to both kinds of service. The need to optimize performance for reception conditions is also common to both since cable does not provide equal-quality signals to all receivers.

The overall object of the invention is to overcome the limitations of existing and proposed TV transmission systems, particularly in connection with broadcasting of coded HDTV signals. In systems that use a single centralized transmitter, the invention permits good performance in spite of multipath (ghosts or echoes), noise, and interference. It makes efficient use of spectrum and optimizes picture quality at each receiver in the light of its individual reception conditions. It permits the use of relatively inexpensive receivers (typically with small screens) in applications where maximum image quality is not required. In single-frequency networks, in which the reception area of a station is served by a cellular array of low-power transmitters, all operating on the same frequency, its remarkable resistance to multipath permits satisfactory operation in spite of the presence of many strong ghosts. In all applications, the invention permits the use of less sophisticated antennas and simpler channel equalizers than are required for currently proposed all-digital systems.

SUMMARY OF THE INVENTION

In one aspect, the invention deals with source-coding systems that produce two classes of data, one that requires nearly perfect transmission and a second that tolerates some noise and distortion. In this aspect, the first class of data is transmitted digitally at a very low error rate while the second class is transmitted as analog or multilevel quantized ("digital") samples that generally have noise added in transmission. Data samples of the second class are subjected to a SS operation and are combined with data samples of the first class, producing hybrid symbols.

It should be noted that virtually all systems that have been proposed for HDTV are of the type that produce two classes of data as mentioned above. All these systems are based on transformation into the frequency domain. What is transmitted comprises selected transform coefficients plus identifying data, velocity vectors, etc. The coefficients do not need very precise transmission, while the other data does.

In another aspect, the said hybrid symbols are divided into a multiplicity of symbol streams (typically hundreds or even thousands of such streams) each of which modulates a different carrier in an OFDM processor, said carriers being equally spaced throughout the width of the transmission channel.

In a third aspect, the video information is encoded in such a way that images of different quality can be produced by the receiver by using different fractions of the received data, the channel coding being arranged in such a way that less than all the data can readily be extracted from the received signal by an inexpensive receiver.

In a fourth aspect, the SS process permits control of the relative SNR of the various spatial-frequency components by appropriately weighting the spread components before transmission.

In a fifth aspect, the OFDM process eliminates inter-symbol interference up to a given temporal spread of echoes by incorporating a guard interval into the transmitted signal.

In a sixth aspect, a very simple channel equalizer is made possible by using such a large number of carriers that the gain and phase distortion of the channel is essentially constant across the band occupied by each carrier and its sidebands.

In a seventh aspect, the effect of multipath distortion on the relative SNRs of the recovered data of the second class is equalized by choosing appropriate parameters for the SS and OFDM processors. All the recovered data has the same noise content in spite of different CNR for each carrier. (In this application, the term SNR is reserved for image data recovered at the receiver, while the term CNR refers to the carrier-to-noise ratio of transmitted data.)

In an eighth aspect, errors due to channel impairments are minimized and the error-producing effect of ghosts is lessened by using a concatenation of convolutional coding and Reed-Solomon coding.

In a ninth aspect, the effect of impulse noise in both the time and frequency domains is minimized by using a combination of SS and OFDM.

In a tenth aspect, a transmission constellation is used in which data of the first and second classes can be recovered independently.

Other advantages and features will become apparent from the following description of the preferred embodiments and from the claims.

DESCRIPTION OF THE PREFERRED EMBODIMENTS

Spread Spectrum

Figure 1:
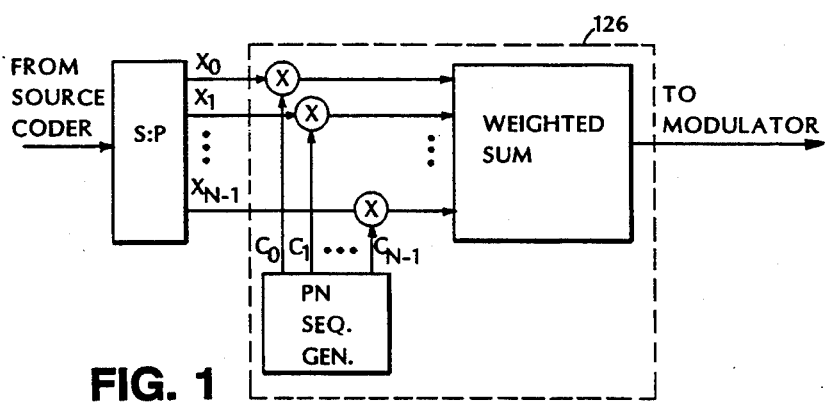
FIG. 1 shows a spread-spectrum encoder in which the product signals are weighted to establish their relative SNR when recovered at the receiver.
Figure 2:
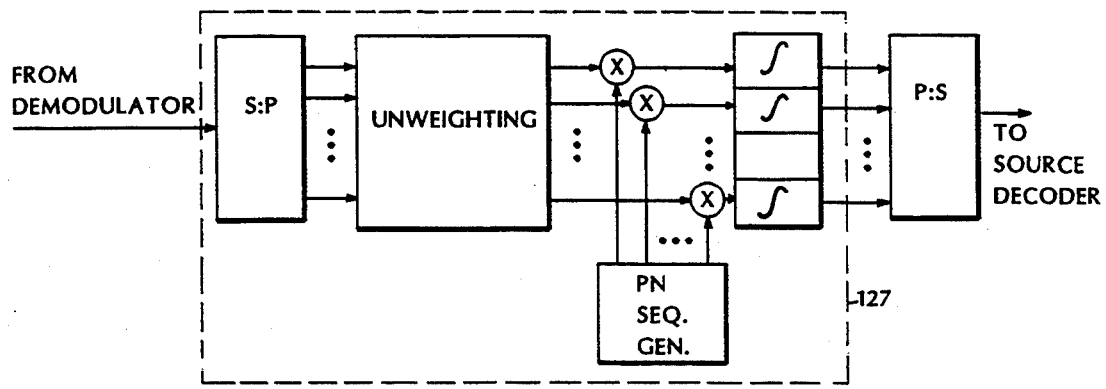
FIG. 2 shows a spread-spectrum decoder appropriate to the encoder of FIG. 1.

Transmission of video signals using SS is described in detail in the '021 patent, and will be summarized here only for the sake of completeness. The general idea of the scheme is to divide the wideband video signal into a multiplicity, N, (typically N=256 to 2048, but higher or lower values may be used) of separate components of correspondingly narrower bandwidth and lower data rate. As shown in FIG. 1, each sample of each component is multiplied by a different pseudorandom (PN) sequence of length N, thus being spread to full channel bandwidth. The N product signals are added and transmitted. The components are recovered at the receiver, as shown in FIG. 2, by multiplying the received sum-of-products signal, in turn, by each of the same sequences and integrating over the symbol time. The N sequences are orthogonal so that the N component signals are recovered without crosstalk. Various methods can be used to divide the original signal into N components. In the '021 patent, a quadrature-mirror filter bank was used in the described embodiment. In this invention, any method may be used, including, for example, a quadrature mirror filter bank or a spatial-frequency decomposition of the motion-compensated prediction error.

An advantage of SS processing is that the relative SNR of the various components can be established by appropriately weighting the components when the sum-of-products signal is formed, at the same time preserving the desirable properties of the transmitted signal, namely that it be of uniform spectrum and have noise-like statistical characteristics.

An important property of SS signals is that each transmitted sample (corresponding in length to that of an element of the PN sequences) is a linear combination of all N components. Successive samples within the length of one sequence are independent linear combinations of the N components. Demodulation to recover the sample values of the N components is, in effect, an inversion of the linear combinations used in the encoder. This inversion amounts to forming the recovered samples by taking N linear combinations of N successive received samples. This averages the noise performance over the N received samples, which is important when these N received samples are transmitted by OFDM with N subcarriers.

Orthogonal Frequency-Division Multiplex

OFDM was invented by Chang in 1965 (U.S. Pat. No. 3,488,445). It is an improvement over conventional frequency division in that no guard bands need be left between the signals in separate subchannels; in fact, the spectra of adjacent-subchannel signals overlap. What makes the signals recoverable independently is their orthogonal nature, which is achieved by imposing the appropriate spectral shape onto the modulated carriers. This improvement means that no bandwidth is wasted. The total required bandwidth is simply the sum of the nominal bandwidth (i.e., half the sampling rate) of each of the separate subchannel signals. The operation of a straightforward OFDM coder and decoder are shown in FIGS. 3 and 4.

Figure 3:
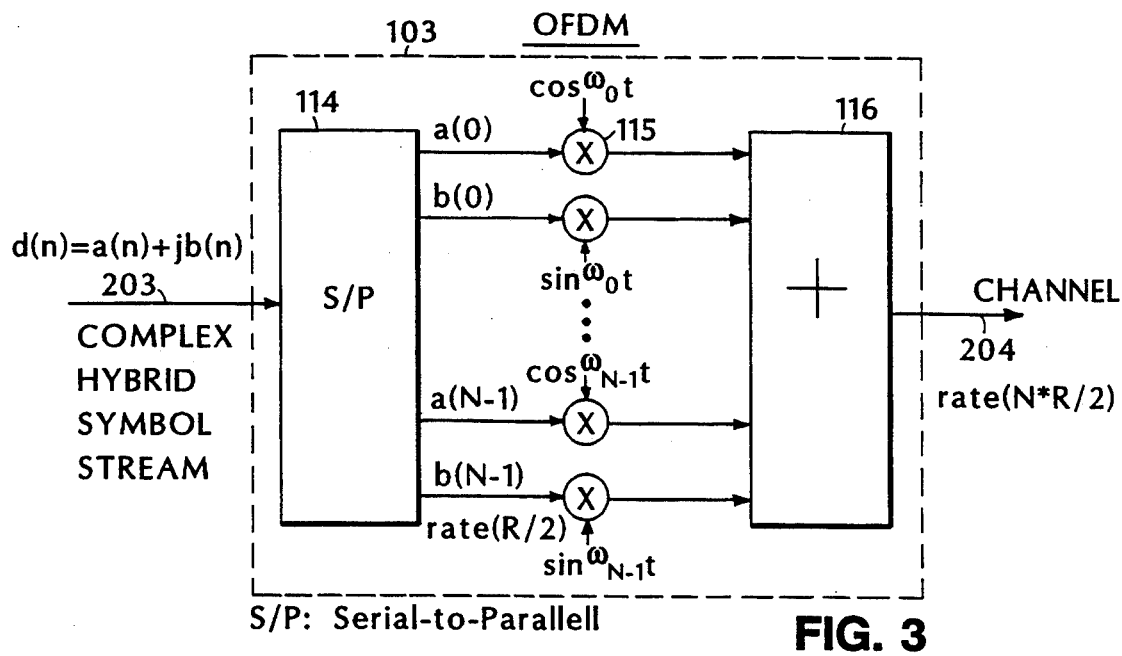
FIG. 3 shows an OFDM encoder implemented with conventional modulators.

FIG. 3 shows the OFDM encoder 103. A stream of complex samples a +jb (a, b real numbers) 203 is input at NR/2 samples/sec to serial-to-parallel converter 114. The latter arranges each N successive samples into an N-wide word. The real parts are multiplied in multipliers 115 by the cosine subcarriers while the imaginary parts are multiplied by the sine subcarriers, all the products being added in adder 116 to produce signal 204 at rate NR/2 complex samples/sec, which is input to the modulator for eventual transmission. The adder includes filters to shape the spectrum of each modulated carrier so as to achieve orthogonality according to the teachings of Chang.

Figure 4:
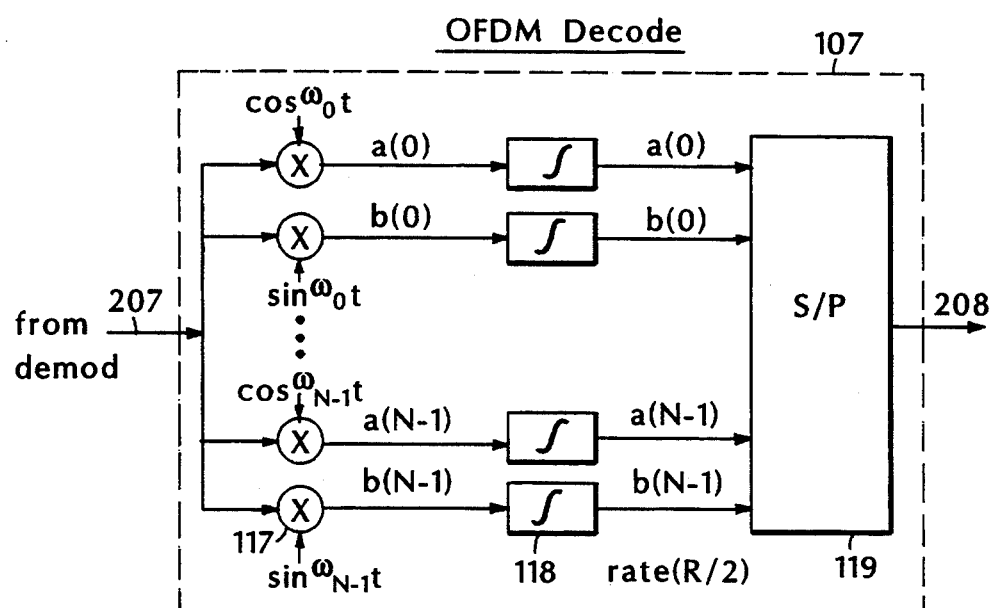
FIG. 4 shows an OFDM decoder implemented with conventional demodulators.

The OFDM decoder 107 is shown in FIG. 4. The signal 207, received from the demodulator, is multiplied by each of the sine and cosine subcarriers by multipliers 117 and integrated over one symbol time by integrators 118. The data is reconverted to a single complex data stream 208 by parallel-to-serial converter 119. If transmission were perfect, data stream 208 would be identical to input data stream 203 of FIG. 3.

The implementation of FIGS. 3 and 4 becomes unwieldy for very large values of N. A very simple method of implementing OFDM was developed by Weinstein and Ebert in 1971 ("Data Transmission by Frequency Multiplexing Using the Discrete Fourier Transform," IEEE Trans. on Comm., COM-19, 10, October 1971, pp 628–634). It is based on the similarity of the expression for the discrete Fourier transform (DFT) of a group of successive input samples to the expression for the desired OFDM channel signal. Since the practicality of OFDM for video applications depends on the DFT implementation, it is important to understand how it works.

Suppose we have a data stream comprising P complex samples every T seconds.

$d_0, d_1, \ldots d_{P-1}$ where $d_p = a_p + jb_p$ (a, b real) Form the DFT of P successive samples.

$$F(q) = \sum_{p=0}^{p=P-1} d_p \exp\left(-j2\pi \frac{pq}{P}\right), q = 0,1,\ldots P-1$$

Note that the real part of the DFT is given by:

$$Re(F) = \sum_{p=0}^{p=P-1}\left(a_p\cos 2\pi \frac{pq}{P} + b_p\sin 2\pi \frac{pq}{P}\right), q = 0,1,\ldots P-1$$

whereas the desired channel signal is:

$$f(t) = \sum_{p=0}^{p=P-1}(a_p\cos 2\pi f_p t + b_p\sin 2\pi f_p t)$$

A sampled version of the channel signal is thus identical to Re(DFT) for sampling times of $t_q = qT/P$ and frequencies of $f_p = 0, 1/T, \ldots p/T, \ldots (P-1)/T$. The method of sampling produces the proper spectral shape so that the carriers are effectively orthogonal. Note that we have not generated the individual carriers by this method; we have only generated a sampled version of the sum of all the modulated carriers, which is adequate for obtaining the proper signal for transmission. Note also that we have omitted all multiplicative constants.

At the receiver, the successive input samples can be recovered by using the inverse discrete Fourier transform (IDFT). We sample the real channel signal to get 2P real samples $y_k$ in time T, for $k=0, 1, \ldots P-1$. We then take the IDFT of these 2P samples to recover the P complex input samples.

$$G(p) = \sum_{k=0}^{2P-1} g_k \exp\left(j2\pi \frac{pk}{2P}\right), p = 0,1,\ldots P-1$$

$$G(p) = a_p - jb_p, p = 1,2,\ldots P-1$$
$$G(p) = 2a_0, p = 0$$

Note that the DFT implementation of OFDM produces output at baseband. The modulator shifts the entire spectrum to the desired radio frequency for transmission.. Conventional implementation produces output at any frequency, depending on the carrier frequencies used in the OFDM processor.

SS and OFDM have the same performance with respect to random channel noise. By themselves, they are equal in performance to straightforward transmission using amplitude modulation of a single carrier. However, they have different performance with respect to temporal impulses and narrow-band interference. (The latter can be considered as impulse noise in the frequency domain.) In SS, each input sample is spread across the entire band, so that narrow-band interference is not catastrophic. OFDM is quite sensitive to narrow-band interference since the latter may obliterate data modulated onto a particular subcarrier. Both are relatively insensitive to temporal impulse noise since the transmitted symbols are of long duration. As we shall see below, the combination has important advantages in this respect.

In the presence of narrow-band interference of known properties, such as a nearby NTSC station, the sensitivity of OFDM in this respect can be used to advantage. Subcarriers in the vicinity of the NTSC vision, sound, and color subcarriers are simply not used, thus greatly increasing the resistance of the OFDM signal to the NTSC interference.

An outstanding feature of OFDM is its resistance to multipath distortion. The primary means by which this is accomplished is to append to the end (or beginning) of each transmitted symbol a guard interval at least as long as the temporal spread of the multipath—typically 20 to 40 microseconds. During the guard interval, the initial (or the final) portion of the symbol is replicated. At the receiver, the decoding process involves integration of the received signal for exactly one symbol duration. If this integration period is anywhere within the total duration of one symbol plus its associated guard interval, then all of the received signals, regardless of their delay, are integrated for precisely one symbol time. The various subcarriers are mutually orthogonal even when shifted. This scheme completely eliminates one of the main effects of multipath, which is intersymbol interference (ISI). Note that channel equalization need not be performed before OFDM decoding, as the use of the guard interval completely eliminates ISI.

When the temporal spread of the multipath happens to be much smaller than the duration of the guard interval, advantage can be taken of the fact that some data is transmitted twice to improve the CNR of the signal by averaging the corresponding signals.

The other main effect of multipath is that the gains and phases of the many subcarriers are different. Multipath is a linear effect, in that the channel output at any instant is a linear combination of scaled inputs occurring over some time interval. The effect is precisely the same as that of a particular linear filter. This is because the frequency response corresponding to reception with a single ghost undulates across the band in an easily calculated manner.

Figure 10:
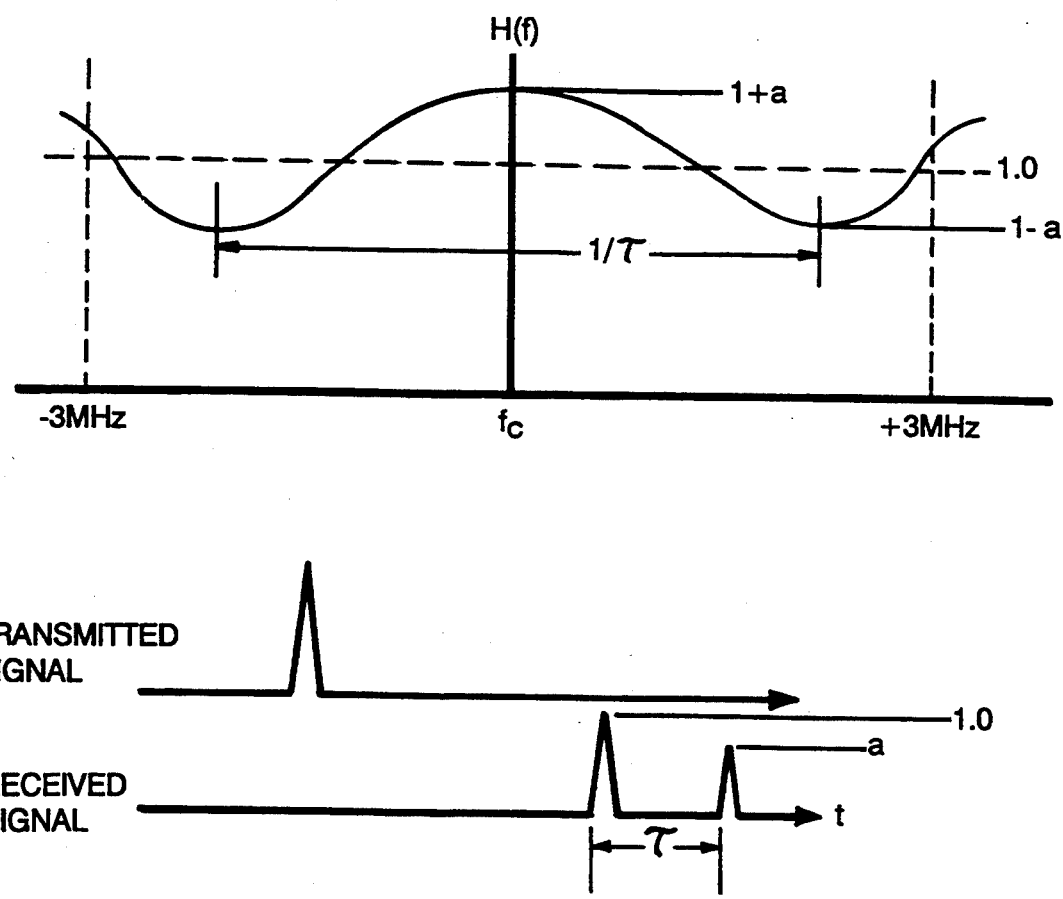
FIG. 10 shows the frequency response resulting from an echo.

FIG. 10 shows an example of multipath and the corresponding frequency response. In this case, each transmitted sample gives rise to a main received sample plus a ghost of amplitude a, $\tau$ seconds later. The amplitude of the frequency response is seen to vary between $1+a$ and $1-a$ across the rf band at a frequency of $1/\tau$. Note that this effect is shown at baseband. In reality, the signal is always modulated on a high-frequency carrier. Very small shifts in $\tau$ cause very large changes in the relative amplitude (but not the shape) of the decoded I and Q signals. Correction is always done at baseband for this reason.

With multiple ghosts of various amplitudes, the frequency response can have many different shapes. With a large number of carriers, one can assume that the response is uniform across the band of each carrier, so that correction can be made with a single gain factor and a single phase factor for each carrier. These correction factors can readily be obtained by observation of calibration signals inserted into the transmitted signal, a procedure well known in the art.

When the gain and phase of each channel are corrected, it is found that the CNR of the corrected signal is different for each carrier. The subcarriers with low gain will have higher noise than those with high gain. For the digital data, this is taken account of in the decoding associated with the error-correction scheme. For the analog data, the SS parameters can be chosen so that the data recovered by the inverse SS operation has a uniform noise level in spite of the varying CNR of the OFDM carriers.

In both SS and OFDM, it is essential that the symbol time be longer than the temporal spread of the multipath. In this way, all the echoes associated with a single transmitted symbol arrive at worst within two successive received symbols, thus reducing the intersymbol interference. For example, if the input signal has a 5-MHz bandwidth, its symbol time is 200 nanosec. Echoes in terrestrial broadcasting typically extend to 10 or 20 microsec, which is many symbol times. By dividing the input signal into, say, 1000 contemporaneous components, each component then has a symbol time of 200 microsec, which is much more than the temporal spread of the multipath. In OFDM with a guard interval, the guard interval itself must be longer than the temporal spread of the multipath. The guard interval is "wasted" transmission time. (Some use can be made of it to improve the CNR.) Therefore, to have high efficiency, the symbol time must be substantially longer than the guard interval. The symbol time of the component signals is N times that of the original input, where N is the number of subcarriers. In cases in which the temporal spread of multipath is large, a very large number of subcarriers may be needed.

SS and OFDM are usually thought of as digital channel-coding methods. However, they work equally well for analog or hybrid analog/digital input signals.

Single-Frequency Networks

An alternative to using a single centrally located high-power transmitter to serve a given reception area is to fill the area with a cellular array of low-power transmitters, all operating on the same frequency. This gives a much more uniform power distribution and also confines the usable signal to a well defined area of almost arbitrary shape. Different stations can be assigned to the same channel in adjacent areas. Except for a narrow "no-man's land," about the width of one cell, between the two service areas, there is little interference, thus allowing many more stations to operate within each locality within a given overall spectrum allocation. Directional antennas are required in the no-man's land, either signal being recoverable by turning the antenna.

In order to operate a SFN successfully, the receivers must cope with multiple signals received from nearby transmitters, and which are identical to large ghosts. OFDM can be used for this application because it completely eliminates the ISI due to ghosts within a given temporal spread. While conventional single-carrier systems can also be used in this application, much more sophisticated channel equalizers and antennas are required. As a practical matter, no known channel-coding method except OFDM can perform adequately in a SFN.

A System Employing SS and OFDM

Figure 5:
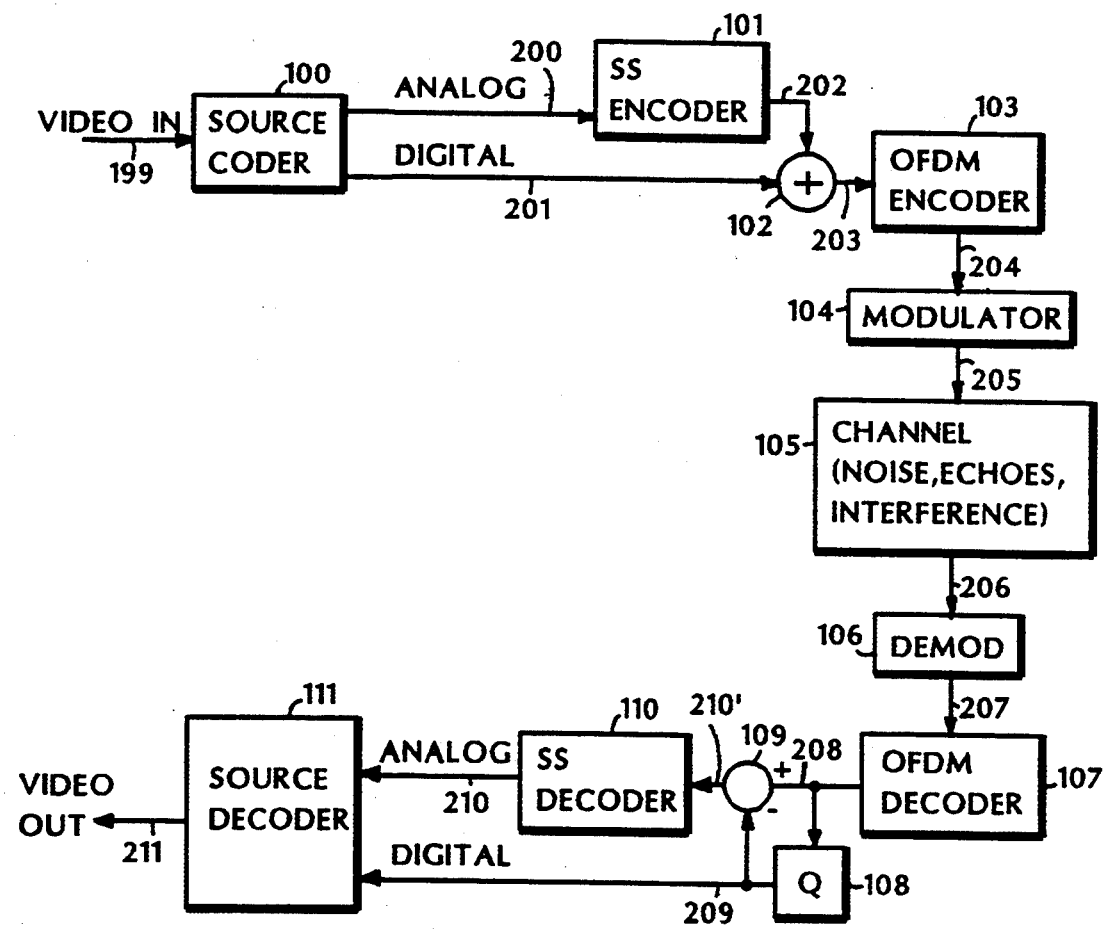
FIG. 5 presents the basic principle of the invention, in which analog data is processed by a SS encoder and then combined with the digital data, the combined symbols then being processed by an OFDM encoder. It also shows how this data is transmitted, received, and decoded.
Figure 6:
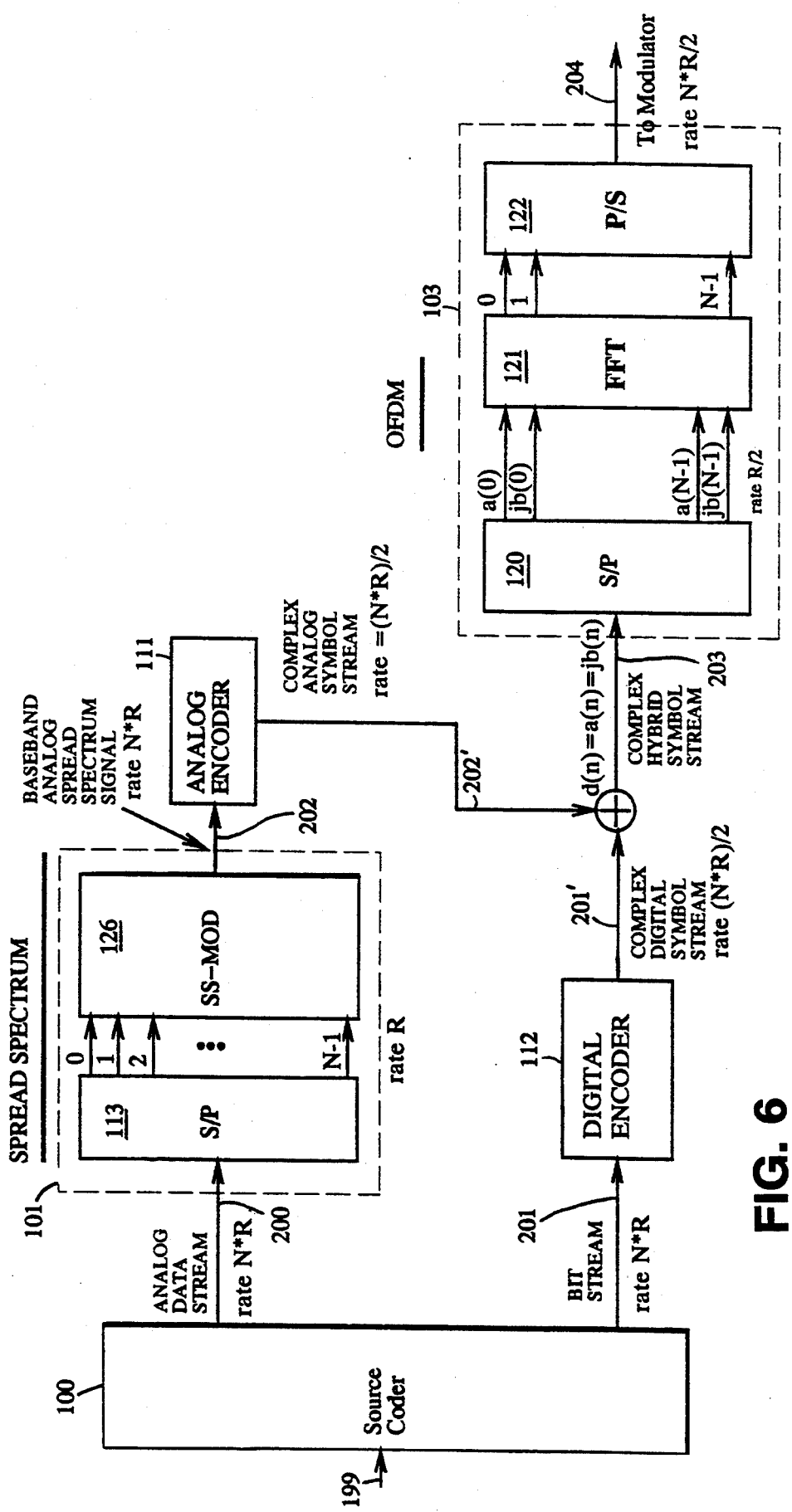
FIG. 6 shows the implementation of an OFDM encoder by means of the discrete Fourier transform.

The basic idea is shown in FIG. 5. A video signal 199 is input to a source coder 100, of a type that produces "digital" signals 201 that require nearly error-free transmission, together with "analog" signals 200 that can suffer some noise and/or distortion without producing catastrophic degradation of the reconstructed image. The analog signals are subjected to a SS process in SS processor 101, after which they are combined with the digital signals in adder 102 to produce hybrid symbols 203. The latter are input to the OFDM encoder 103 to produce the output 204, which is the sum of a large number of modulated subcarriers located at equal intervals over a given bandwidth. The output 204 of OFDM coder 103 is at baseband, i.e., it is centered at zero frequency. The modulator 104 shifts the signal up to the desired radio frequency (RF) for transmission and also implements the desired transmission constellation, as discussed below. An example of a suitable rf modulator and demodulator is shown in FIGS. 5 and 6 of the '021 patent. Note that audio, sync, and data signals as appropriate are multiplexed with the low-frequency digital video signals using techniques well known in the art.

The receiver reverses these operations. The received signal 206 is shifted to baseband by demodulator 106. It is then reconverted to a hybrid symbol stream 208 by OFDM decoder 107. Quantizer 108 produces a quantized version 209 of hybrid symbol stream 208. Signal 209 is the desired reconstructed digital data for the decoder 111, while the analog data 210 for the decoder is found by subtracting digital signal 209 from hybrid signal 208, and processing the difference 210' by SS decoder 110. Source decoder 111 then produces video output 211 which is an approximation to the input 199.

Figure 7:
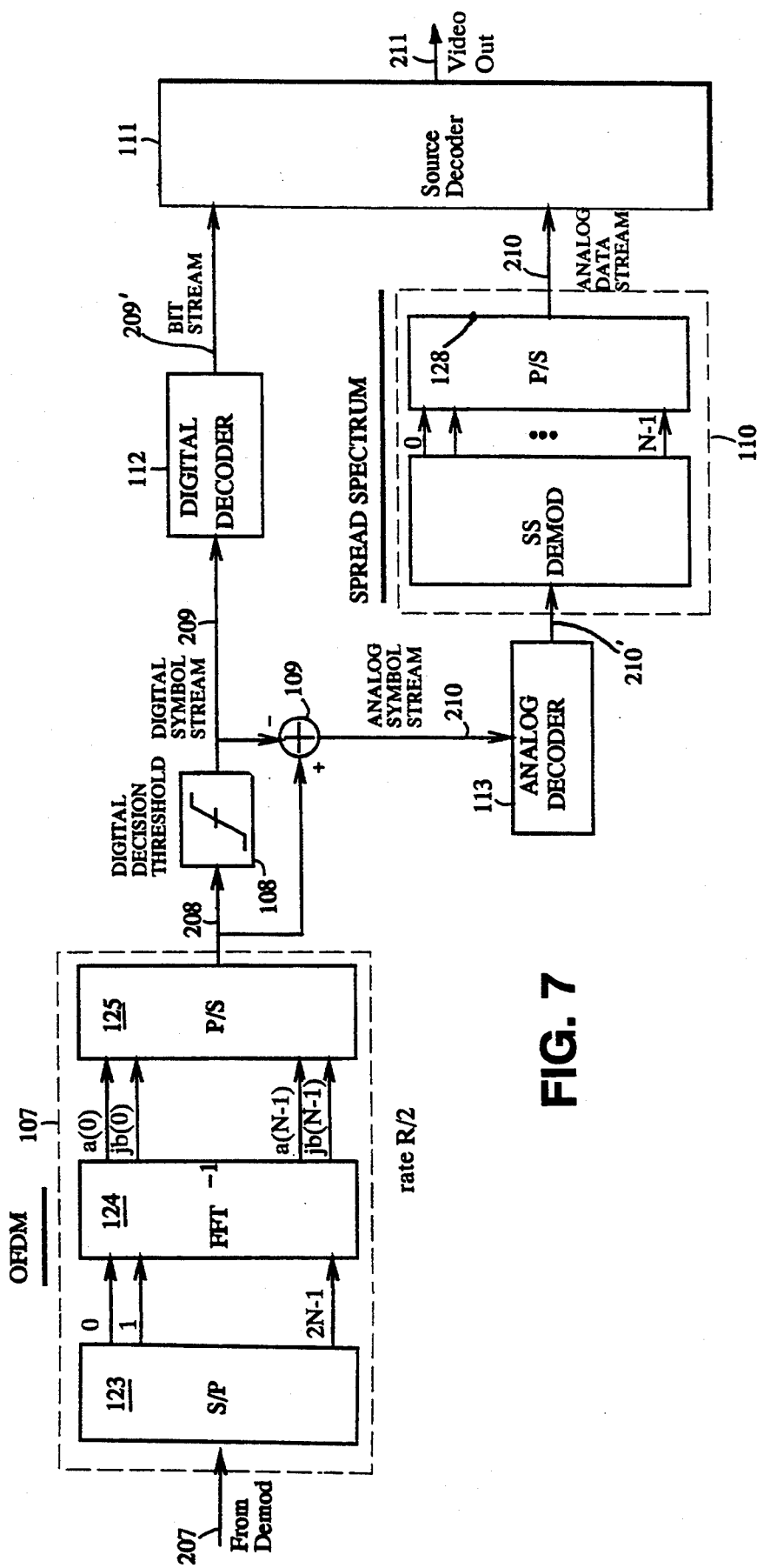
FIG. 7 shows the implementation of an OFDM decoder by means of the inverse discrete Fourier transform.

More detailed diagrams of the encoder and decoder are shown in FIGS. 6 and 7. The DFT implementation of OFDM coding and decoding is used. Like numbers are used in FIGS. 5, 6, and 7 for like parts. These systems deal with signals appropriate for quadrature amplitude modulation (QAM) as in the '021 Patent so that in-phase (I) and quadrature-phase (Q) baseband signals are used to modulate the sine and cosine forms of the carriers. The digital and analog encoders 111 and 112 perform the function of accepting real data at rate NR samples/sec and producing complex data at rate NR/2 samples/sec. It is convenient to think of pairs of symbols a and b as the real and imaginary parts of complex symbols. The real part is the in-phase signal and the imaginary part is the quadrature-phase signal.

In FIG. 6, as in the simplified FIG. 5, input video 199 is encoded by source coder 100 to produce analog and digital data streams 200 and 201 at rate NR samples/sec. Each N successive analog samples are grouped in N-bit words at rate R words/sec by serial-to-parallel converter 113 and are then input to the SS encoder 101. (The serial-to-parallel conversion is unnecessary if the source coder produces data as N-bit words.) In SS unit 101, each sample of each of the N bit streams is multiplied by a different pseudorandom (PN) sequence and then added together with appropriate weighting, as shown in greater detail in FIG. 1, to produce an analog data stream 202 at rate NR samples/sec.

The analog coder produces complex data 202' at NR/2 samples/sec, while the digital coder produces complex digital data 201' at NR/2 samples/sec. These two are added to produce a complex hybrid symbol stream 203 at the same rate. At this point, the value of N, which is the PN sequence length and also the number of samples in each word in the SS processor, is not apparent from the character of the signal 203. The latter appears to be a random digital data stream with a superimposed Gaussian random "noise."

The symbol stream 203 is again divided into N-symbol words for OFDM encoding. It is highly advantageous for the SS value of N to be an integral multiple (usually unity) of the OFDM value of N; we shall assume a value of unity in the following discussion.

The OFDM encoder 103, which is functionally equivalent to that of FIG. 3, consists of a serial-to-parallel converter 120, FFT unit 121, and parallel-to-serial converter 122. Serial-to-parallel converter 120 forms N successive symbols of stream 203 into N-sample complex words at rate R/2. The FFT unit 121 implements the mathematical operation described above. Its N outputs per word are placed in series by parallel-to-serial converter 122 to form the desired output signal. The output 204 is input to the modulator 104 as in FIG. 5.

Incorporation of the guard interval is particularly easy in the DFT implementation of OFDM. As discussed previously, the output 204, which is a sampled version of the sum of modulated subcarriers, is obtained by successively sampling the N outputs of DFT unit 121. If, for example, a guard interval of 25% of the symbol time is required and N=512, then, after sampling the 512 outputs of unit 121 in order, the first 128 are sampled again, giving a total symbol-plus-guard-interval duration of 640 samples. This function can readily be incorporated within parallel-to-serial converter 122 by means well known in the art.

FIG. 7 shows the corresponding operation at the receiver. The input signal 207 received from the demodulator is a complex signal stream at baseband at rate NR/2 complex samples/sec. OFDM decoder 107 is functionally equivalent to that of FIG. 4. The input data is formed into N-symbol words at rate R/2 by serial-to-parallel converter 123 and then subjected to the OFDM operation by discrete Fourier transformer 124. The resultant N complex values are reconverted to a single complex data stream 208 by parallel-to-serial converter 125. The result is quantized by quantizer 108, the output 209 being subtracted from the hybrid symbol stream to get the analog values 210. Both these data streams are reconverted to real samples at rate NR by decoders 112 and 113.

SS decoding is performed by unit 110, which implements the process shown in FIG. 2. The input data is grouped into N-sample words, multiplied by each of the PN sequences and integrated over the symbol time by the SS decoder 127. This recovers the N analog values independently. They are placed into a single data stream 210 by parallel-to-serial converter 128 and input, along with digital data 209' to the source decoder 111, whose output is the final reconstructed video signal 211.

Noise Performance and Error Correction

Analog data

The described embodiment, for the most part, employs a hybrid analog-digital signal format as in the '021 patent. Analog signals are added to multilevel digital signals for transmission and are recovered at the receiver as the difference between the recovered hybrid signal and its quantized version. The spread-spectrum operation is used to permit appropriate weighting of the various frequency components while at the same time preserving a uniform spectrum and Gaussian amplitude probability distribution. The hybrid symbols are transmitted through the channel using OFDM, which primarily protects against ISI due to multipath.

As previously explained, one effect of multipath on OFDM is to produce a nonuniform CNR for the data modulated onto the various subcarriers. What is going on at the receiver is unknown at the encoder and therefore cannot be precompensated, for example by transmitting different carriers at different amplitudes. However, the effect can be completely removed if the PN sequence length is exactly equal to the number of subcarriers, or is an integral multiple thereof. This comes about because, in the SS decoder, each of the N output samples is formed by a different linear combination of analog samples associated with each subcarrier, where the coefficients of the combination are either $+1$ or $-1$. The rms value of noise in the output samples is thus the sum of the rms noise of the various subcarriers, and this is the same for all N output samples.

Alternatively, the noise level of the N output samples of the OFDM decoder, rather than being directly averaged in the SS decoder, can be used to make an optimum recovery of the N samples input to the SS encoder at the transmitter. This is possible because, in the SS decoder, the elimination of any decoder input sample simply produces some random noise in the decoder output, which may be weighed against the noise that is added to the decoder output on account of noise in the OFDM decoder output.

A first-order scheme is to set to zero any output sample that is so noisy that it makes the output worse rather than better. A more elaborate method is to weight the inputs to the SS decoder according to their noise level. This weighting may be optimized for each of the N output samples of the word.

At the SS encoder, samples of the various spatial frequencies will have been weighted in accordance with the desired SNR of the recovered data. Thus the N output samples will have different amplitudes but the same noise, as required for optimum performance.

Digital data

Shannon's fundamental theorem shows that digital data can be transmitted through an analog channel at a rate in bits/sec no higher than the channel capacity, C, where C depends on the channel bandwidth and CNR at the receiver. See, C. E. Shannon et al., *The Mathematical Theory of Communication*, University of Illinois Press, 1984. Furthermore, the theorem states that it is possible to send data at a rate arbitrarily close to C with arbitrarily low error rate, although no codes that can actually achieve this performance were described by Shannon. Thus C represents an upper bound—a yardstick by which the performance of codes may be compared. In the period since 1948, many workers have attempted to design such codes, with varying degrees of success.

Figure 8:
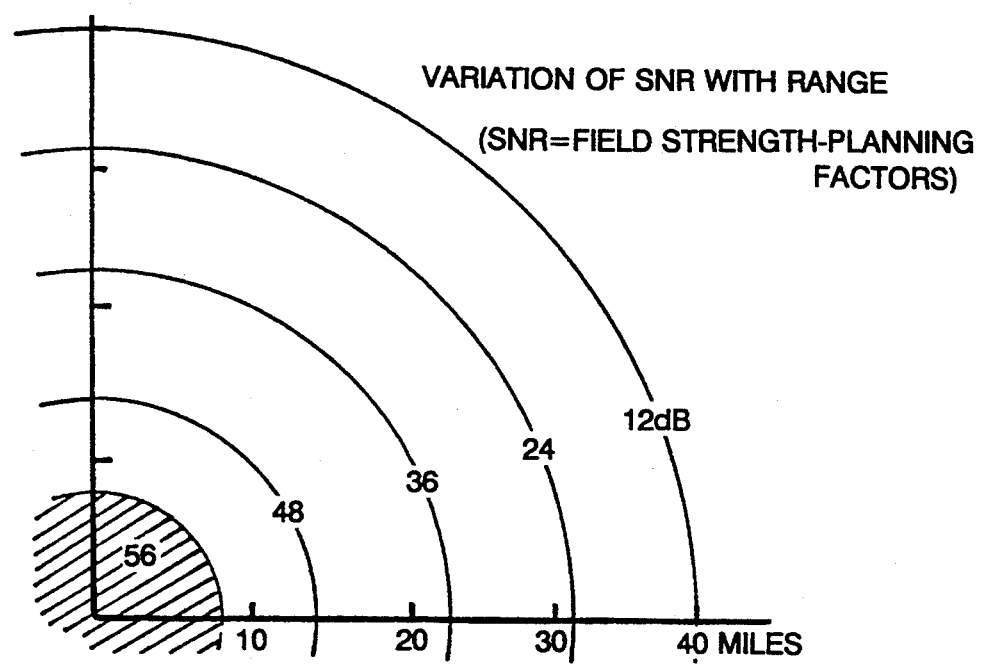
FIG. 8 shows a typical example of the variation of CNR with range, in this case with an antenna height of 1350 feet.

The broadcasting application presents a number of very difficult problems to the system designer. In addition to noise, multipath, and interference, there is a large difference in signal level, and therefore CNR, at the different receiving sites. In today's over-the-air broadcasting, the signal strength decreases very rapidly with distance in the outer regions of the reception area. A typical example of this is seen in FIG. 8. In cable systems, the use of signal splitters also has the effect of producing large differences in signal level from receiver to receiver, although generally not to the same degree as in the over-the-air case. Large numbers of low-level echoes are common in cable as well, largely due to the presence of unterminated connectors.

The echoes must be removed nearly completely in order to transmit digital data at the Nyquist rate, i.e., two samples per cycle of bandwidth. Once echoes have been eliminated, the number of bits that can be transmitted per sample at a given data rate depends on the noise level. Thus achieving the highest data rate depends both on removing the echoes and on dealing with the noise.

In the transmission of coded video information in accordance with the invention, data that must be received nearly error-free is transmitted digitally. However, the presence of noise inevitably produces errors. One way to reduce the bit error rate (BER) is to transmit very few bits/sample—perhaps as few as one. This rate is very low and is, moreover, wasteful of channel capacity at receivers with higher CNR. Two kinds of coding can be used to correct these two problems. Reed-Solomon coding is used to achieve very low decoded BER under conditions in which the BER without error correction would be unacceptably high. The price paid is a fractional reduction in the net transmission rate. Trellis coding (also called convolutional coding) is used to achieve higher transmission rate by taking advantage of the extra channel capacity made available when the CNR is higher than the absolute minimum. Both of these schemes are described in G.C.Clarke et al, *Error-Correction Coding for Digital Communications*, Plenum Press, NY, 1981. In addition, it is possible, by proper design of the signal constellation, to make more data recoverable at high CNR than at low CNR.

Reed-Solomon codes

Reed-Solomon codes use a kind of sophisticated "parity check" scheme in which check bits are added to groups of information bits. For example, if 5-bit data words are to be transmitted, the addition of 3 check bits permits the correction of any single error in the 8-bit transmitted word. That this is reasonable is seen from the fact that it takes 3 bits to identify which of the 8 bits is in error. Another way to look at this is that there are 32 possible 5-bit words and 256 possible 8-bit words. Since the extra 3 bits are derived from the 5 data bits, only 32 out of the 256 possible 8-bit words are transmitted. At the decoder, the word that was transmitted is deduced from the word that is received, even if it has one or more errors, by selecting which of the 32 possible transmitted words has the smallest "distance" (in 8-dimensional space) from the received word. In calculating the distance, account can be taken of the reliability of each of the received bits in the case where the received data is not of equal CNR. In this case, the decoder chooses the most probable transmitted word.

In the example given, the data transmission rate is ⅝ of the maximum possible rate (the Nyquist rate) as given by the bandwidth of the channel.

Trellis codes

These codes were first described by G.Ungerboeck in "Channel Coding with Multilevel/phase Signals," IEEE Transactions on Information Theory, IT-28, pp 55–67, January 1982. The author pointed out that, for a given number of bits/sample transmitted, the actual received data rate depended on CNR, eventually flattening off at the transmitted value when the CNR became high enough so that there were almost no errors. (Errors effectively reduce the net data throughput.) Higher transmission rates could be obtained at higher CNR by transmitting more bits/sample, i.e., by using more levels (or phases) in the transmitted signal. The improvement is called coding gain.

In TV broadcasting, particularly in the case of a single centralized high-power transmitter, the theoretical data rate varies a great deal with distance. Analog systems automatically take advantage of this situation by providing better pictures closer in. Conventional digital systems, which try to transmit the same data rate to all receivers, thus waste a large amount of channel capacity at close-in locations, and provide no service at all beyond a sharply defined threshold.

An example of a trellis code could be based on the Reed-Solomon code already described. Suppose we added 4 check bits to each 4 data bits. Only 16 possible words are used, so the rate would be 0.5 as a Reed-Solomon code. However, instead of sending 8-bit words, we would send 4-symbol words, with 2 bits (4 levels) per symbol. The rate is now 1.0. Decoding would be by maximum likelihood, and an extremely rugged system would result.

In the invention, the trellis coder is implemented as a convolutional coder, with the output mapped to a higher-order constellation. For example, a shift register of length K receives binary data at a given rate. Two different logical functions of the data in the register at each sample time each produce binary data at the same rate. Thus the total output data rate is doubled. If the extra bits are used to produce extra levels rather than increasing the sample rate, then it is a trellis code. For example, we can use a shift register of length 3. We take as output the sum modulo 2 of the data in positions 1 and 3 and the sum modulo 2 of the data in all three positions. These two outputs are then used to make a 4-level (2 bits per sample) signal. Another kind of trellis coder, more pertinent to our application, uses the two sum signals as I and Q signals on the QAM output from the transmitter. Each symbol represents 2 bits, but as a 4-phase rf signal rather than a 4-level baseband signal.

Figure 9:
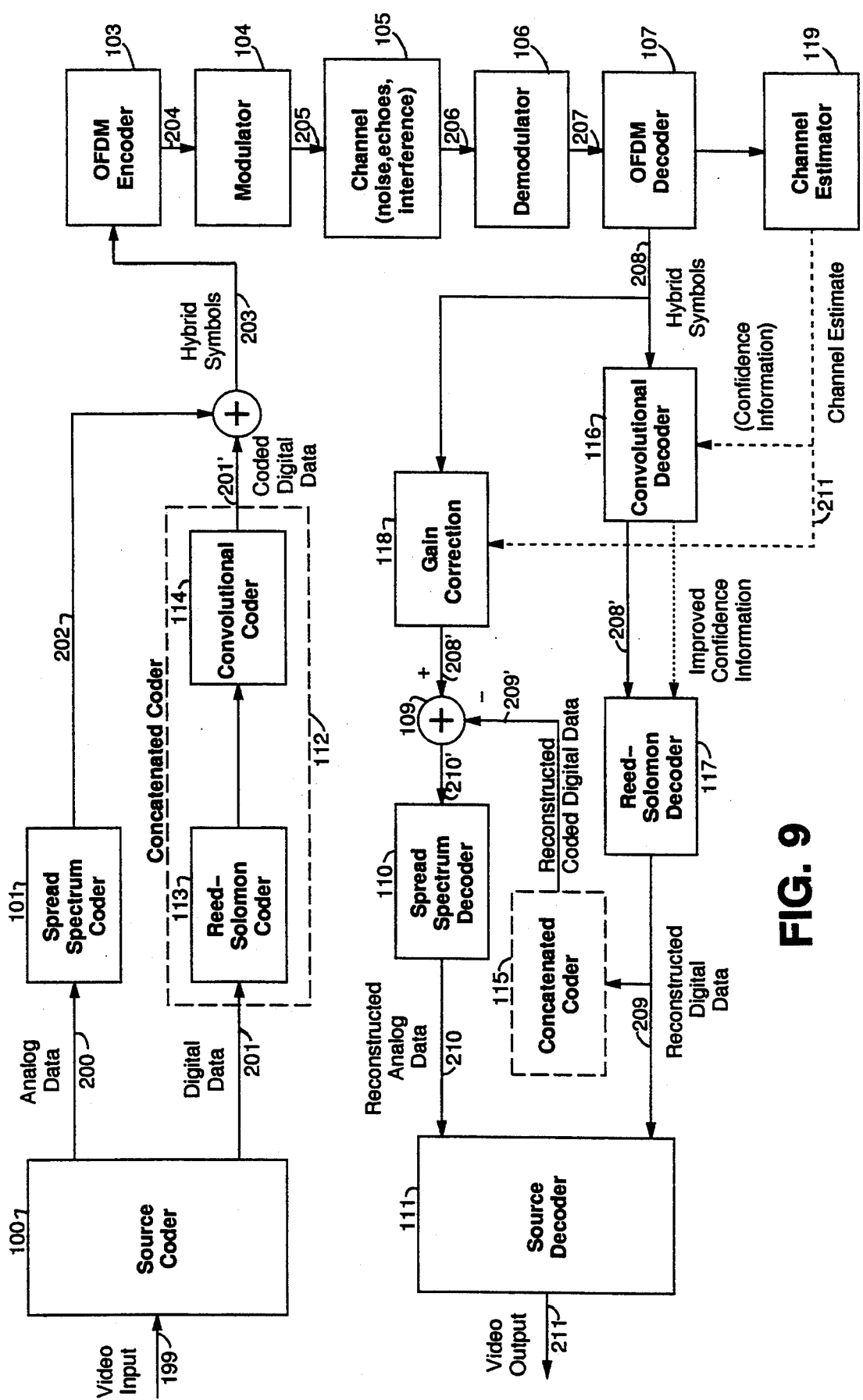
FIG. 9 shows a block diagram of the invention with error correction and channel equalization shown explicitly.

FIG. 9 is a block diagram of the invention showing the use of error-correction coding. It is at the same level of complexity as FIG. 5 and uses like numbers for like objects. The additions to the system of FIG. 5 include the concatenated coders 112 and 115, comprised of Reed-Solomon coder 113 and convolutional coder 114. It also includes convolutional decoder 116 and Reed-Solomon decoder 117. In addition, we show the channel-equalization means, which includes channel estimator 119 and gain-correction means 118. In the encoder, the digital data from source coder 100 are processed by the concatenated coder 112 to produce coded digital data 201' which is added to the analog output 202 of the spread spectrum coder 101 to produce hybrid symbol stream 203, which is then processed as in FIG. 5.

In the receiver, a channel estimator 119 examines the output of the OFDM decoder 107 to calculate the gain and phase correction of each subchannel. These corrections are applied to signal 208 by gain correction means 118 to produce corrected signals 208'. (Alternatively, the gain corrector can be placed between demodulator 105 and OFDM decoder 107.)

Channel estimation can be implemented in a number of ways well known in the art. One method is to transmit an easily detected "training" signal of a predetermined amplitude and phase periodically on all subchannels. For example, the sequence $I = 1, 0, -1, 0, 1, 0, -1, 0 \ldots$, $Q = 0, 1, 0, -1, 0, 1, 0 \ldots$, where I is the in-phase component and Q is the out-of-phase component, is such an easily detected signal. The actual received values can be used to determine the correction required for each subchannel. Another method is based on the fact that the symbol time is longer than the multipath spread. This means that each received constellation is simply rotated (less than 360 degrees) and changed in amplitude. Since the analog values added to the digital levels have a mean value of zero and a Gaussian distribution, they do not prevent the received constellation from being obvious. In that case, the required gain and phase changes can be determined directly from the received constellations without any need for a training signal.

To determine the CNR of each subchannel, it is first necessary to measure the noise level. This can be done by observing the received training signals after correction and subtracting the known transmitted values from the actual received values, leaving only the noise. The CNR is used to determine the reliability of each received datum so that it can be properly weighted in the Reed-Solomon and convolutional decoders.

The digital data is now recovered by processing symbol stream 208 by the convolutional decoder 116 and Reed/Solomon decoder 117. (It is not necessary to first remove the analog data accompanying the digital data in symbol stream 208 since it acts merely as noise.) The amplitude of the gain correction for each subchannel gives a measure of the reliability of the data transmitted. Subchannels with low gain have lower CNR and less reliable transmission. This information is used to improve the operation of the two decoders. For example, in computing which of the possible transmitted words resulted in a particular received word, it is normal to compute the distance in N-dimensional space between the received word and each of the possible transmitted words, and then to choose the closest word. In this computation, the contribution to the calculated distance of each sample from each of the N subchannels is weighted in accordance with its probability of being noise-free.

In order to extract the analog data from the hybrid symbol stream 208', a digital data stream as much like 201' (in the transmitter) as possible must be produced. Therefore the decoded digital data is processed by concatenated coder 115 which is identical to coder 112 in the transmitter. The reconstructed coded digital data 209' is identical to the corresponding data stream 201' at the transmitter except for uncorrected transmission errors. Data stream 209' is subtracted from symbol stream 208' to produce analog data stream 210' which is decoded by SS decoder 110 as in FIG. 5.

Alternative Embodiments

Many variations are possible within the scope of the invention to deal with different applications. We deal here with four important applications.

A SFN version

An alternative to the use of a single centralized transmitter is to serve the reception area of a station with a cellular network of low-power transmitters, all transmitting the same signal on the same frequency. Receivers, for the most part, use omnidirectional antennas and thus "see" a number of different signals, indistinguishable from ghosts. In this case, the temporal spread of the ghosts is the time for the electromagnetic wave to travel 2 or 3 cell diameters. If the cells were several miles across, the temporal spread might be as large as 50 to 100 microseconds, which is considerably larger than would be encountered with a single transmitter. With a very long echo spread, (and guard interval), it is desirable to increase the symbol time in proportion so as to maintain efficiency. Note that for stationary transmitters and receivers, there is no theoretical upper limit to the symbol time, as there is in mobile applications because of the Doppler effect.

The complexity of the DFT used for encoding and decoding is proportional to N log N, where N is the number of subcarriers. However, the computation rate is inversely proportional to N (the more carriers, the lower the data rate in each subchannel), so that the number of computations per second is proportional only to log N. Thus it is apparent that the cost of using a large value of N is not great. To accommodate the system to SFN operation, it is only necessary to use a large value of N, which is seen to be practical.

Mulitresolution operation

For a number of reasons, it is highly desirable to provide a number of levels of quality in the encoded and transmitted signal. Inexpensive low-resolution receivers ought to be able to extract a portion of the data with a simple decoder. In addition, the smaller the data rate at which some service is provided, albeit not of full resolution, the greater the coverage area with a centralized transmitter. Finally, at close-in locations that have very high CNR, we do not want to limit the performance to what is achieved at the boundary of service.

In the '227 Application, a system with three thresholds is described. At the lowest CNR, 5 Mb/s are received. At the middle threshold, 10 Mb/s plus 5 analog Msamples/sec are received. At the highest CNR, we get 10 Mb/s plus 10 Msamples/sec. Similar methods can be used in the present invention.

To ensure that attractive pictures are produced at all resolution levels, some deviation from the DCT and quadrature-mirror filters (QMF) of the '021 Patent and '277 Application is desirable. The earlier methods were primarily designed to get the highest compression ratio. As a result, a picture composed from less than all of the coefficients used for the highest-resolution result tends to have artifacts due to uncancelled aliasing. An alternative method is to used pyramid coding (e.g. see, P. J. Burt et al., "The Laplacian Pyramid as a Compact Image Code", IEEE Trans. Comm COM 31, 4, pp 532–540, April, 1983). In this method, a smooth low-pass filter, such as Gaussian or Sharpened Gaussian (e.g. see W. F. Schreiber et al., "Transformation Between Continuous and Discrete Representations", IEEE Trans PAMI, 7, 2, pp. 178–186, March, 1985) is used to extract data corresponding to an attractive low-resolution image. This data is then subtracted from the original video data to get the high-frequency component. The process is repeated with more low-pass filters until we have a number of components. With such filters, we can be assured that as we add more and more components to the data for the first low-resolution image, the quality will improve step by step.

The disadvantage of pyramid coding is that the compression ratio is generally lower than would be obtained with more sharply cutting filters such as those of the DCT and QMF. The invention deals with this problem by using interframe coding to raise the compression ratio, at least for the lowest-resolution level in the pyramid. The higher levels in the pyramid can use either intraframe or interframe coding.

While interframe coding is inherently more complicated that the intraframe coding of the '021 Patent, it has become practical for the lowest level in the pyramid because inexpensive chips are becoming available to implement the MPEG algorithm (LeGall, Bidier, "MPEG: A Video Compression Standard for Multimedia Applications", Communications of the ACM, Vol. 34, No. 4, April, 1991, pp. 47–58). MPEG is an internationally standardized compression method. It is appropriate for the resolution that might be used at the lowest level. With such chips, it no longer matters how complex the algorithm is.

Figure 11:
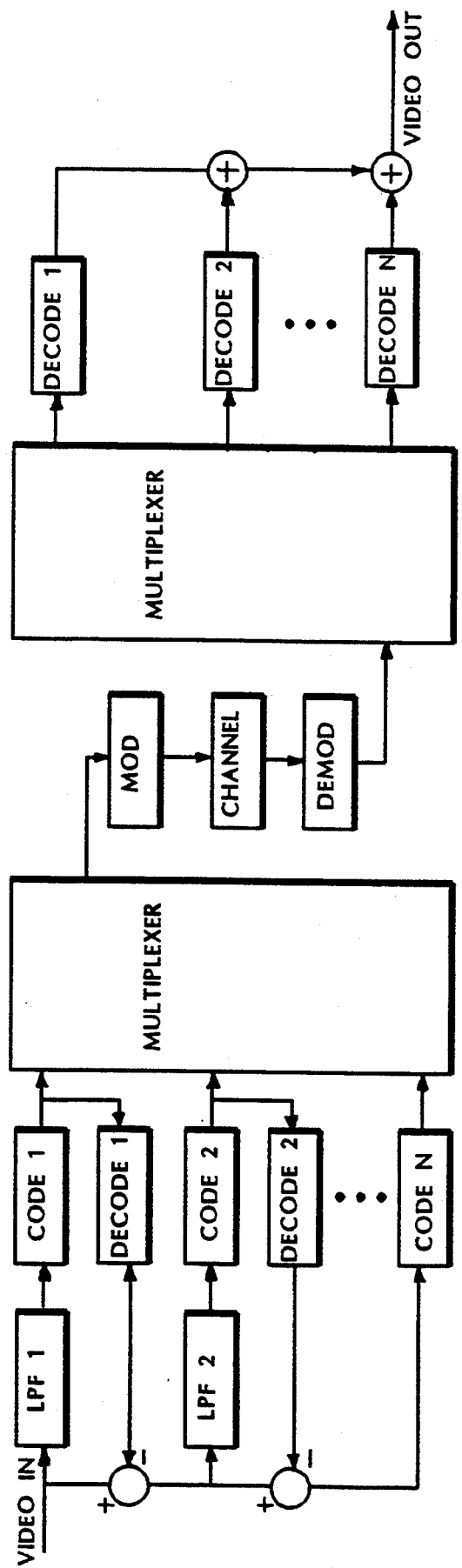
FIG. 11 shows a pyramid coding scheme that can be used with the inventions when a number of different performance levels are desired at different CNR or for receivers of different price.

In FIG. 11, a scheme is shown for a pyramid coding structure suitable for multiresolution operation. The general idea is that data corresponding to a picture of the lowest resolution is extracted by a first low-pass filter, coded, decoded, and then subtracted from the original data stream. A second low-pass filter of higher bandwidth from that of the first is now applied to the remaining data and the process is repeated. Each step produces a coded data stream for transmission that represents the information required to augment that of the earlier steps in precisely the manner required to increase the resolution. A greater or smaller number of coded data streams is used by each receiver, according to its price/performance nature, and according to the receiver CNR. Note that by subtracting the decoded data from the video data stream, any errors in the coding process are put back into the difference signal so that they may be used at the next higher level.

To apply the pyramid concept shown in FIG. 11 to the encoder of FIG. 6, the digital data stream from the encoder is divided into two portions corresponding to the first two levels of the pyramid. The first portion comprises the entire data stream for a low-resolution image using, for example, MPEG coding. The analog data comprises selected coefficients representing the second level in the pyramid of FIG. 11, while the second portion of the digital data comprises identification of the selected coefficients. The two digital streams are combined as disclosed in the '227 application to achieve the separate thresholds. Thus, at the lowest CNR, only the first portion of the digital data is recovered, while at somewhat higher CNR, all the digital data plus the analog data is recovered, producing a better picture. As the CNR gets higher and higher, the SNR of the reconstructed image continues to improve.

Transmission constellations

The description so far of the OFDM implementation by means of the DFT or by conventional methods is directed towards a QAM signal constellation. The I (in-phase) signal effectively modulates the cosine carrier and the Q (quadrature phase) signal effectively modulates the sine carrier. Both modulating signals are hybrid analog/digital symbol streams. After the I and Q streams are demodulated to baseband, the digital data is found by quantization and the analog data by subtracting the digital data from the hybrid symbols. This method works particularly well for the intraframe coding in the embodiments described in the '021 Patent and the '027 Application, since the 6-MHz channel readily supports the transmission of 5 million hybrid symbols/sec. With QAM, We can send 10 Mb/s digital plus 10 Msamples/sec analog by this method.

Figure 12:
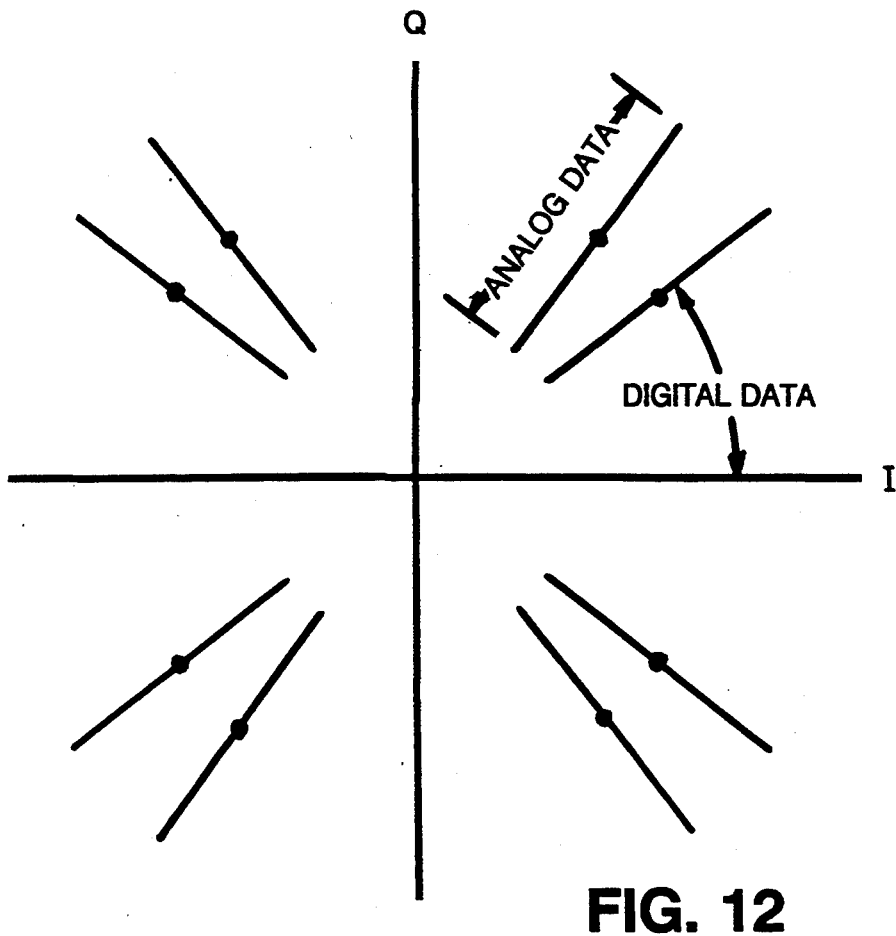
FIG. 12 shows an 8-PSK constellation that can be used with the invention.

Intraframe coding gives us an additional compression factor of 2 or 3 at the same reconstructed image quality. Therefore, we can get better-than-NTSC quality at 5 Mb/s and, even for HDTV, do not need more than 5 analog Msamples/sec. In this case, an alternative constellation can be used that offers particular advantages for the practice of the invention. This constellation is shown in FIG. 12. It is describable as a nonuniform 8-PSK (phase-shift keyed) scheme with analog data riding on top in the radial direction.

Figure 13:
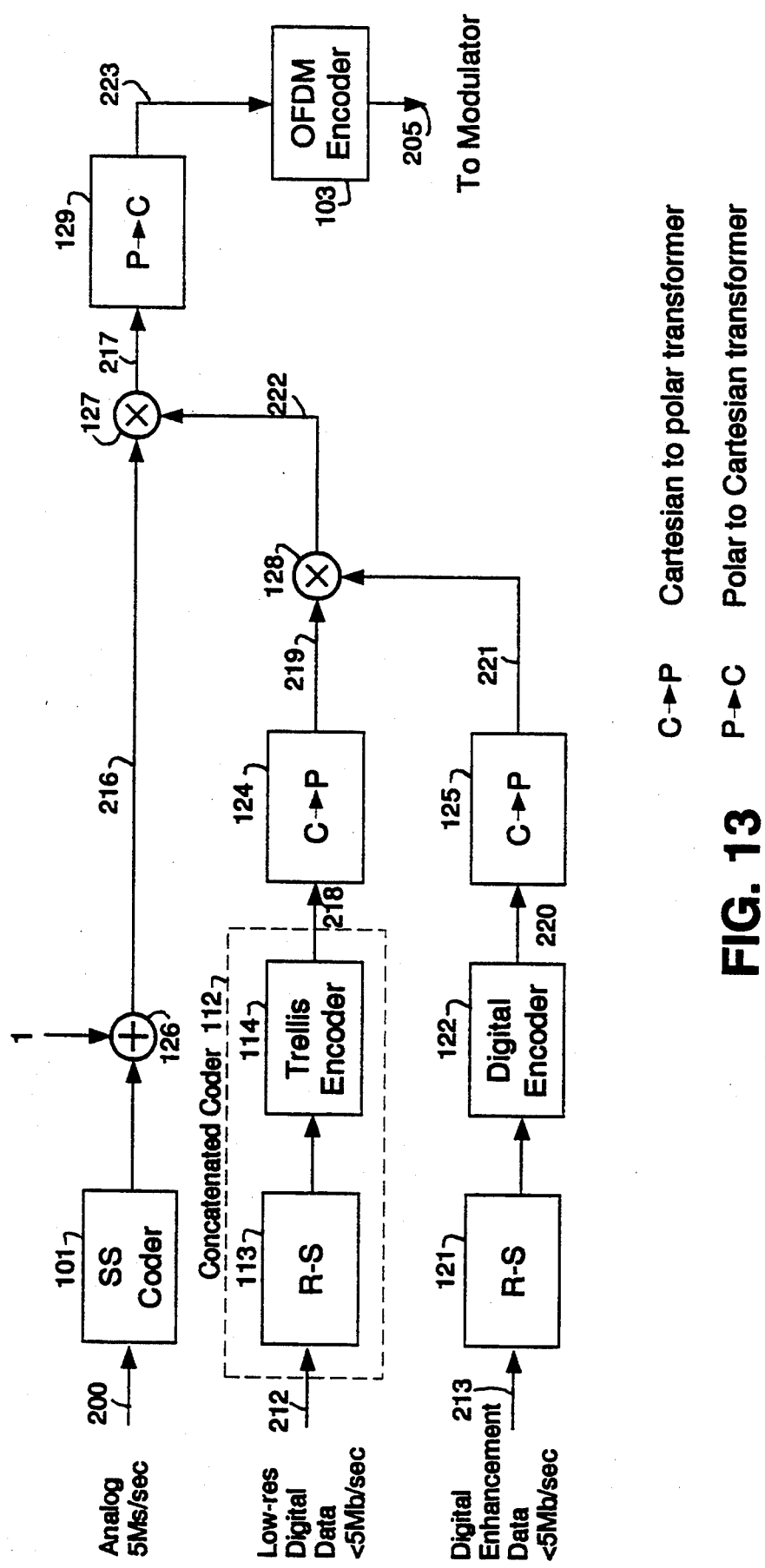
FIG. 13 shows an encoder that can be used to generate the constellation of FIG. 12.

This constellation offers higher CNR than QAM for the analog data; in fact the CNR is as little as 3 dB below what it would be if the analog data were transmitted by itself. The digital and analog information are independent when operating in polar coordinates, so it is no longer necessary to subtract quantized signals from hybrid symbols to obtain the analog output. The gross digital data rate is 3 bits/symbol. With trellis coding, we have net data rates of 5 or 10 Mb/sec depending on CNR, using 8 levels of phase shift. FIG. 13 shows an encoder that uses the constellation of FIG. 12 to send a signal that can be decoded as 5 Mb/s at very low CNR and as 10 Mb/s plus 5 Msamples/sec at higher CNR. As the CNR goes higher and higher, the SNR of the recovered analog data rises. If desired, the analog samples can be weighted in the SS encoder so that more and more of them become useful at higher and higher CNR.

The input signals comprise the analog data 200 at 5 Msamples/sec, representing the amplitudes of the selected coefficients of the motion-compensated residual, digital data 212 at somewhat less than 5 Mb/s representing the low-resolution image that is received under the worst conditions, and a second digital signal 213 of like rate that represents the data required to make use of the analog samples, namely the adaptive selection data, motion vectors (if any), etc. The SS coder 101 receives the analog data and processes it into an analog data stream at 5 Ms/s as before. The value unity is added to this signal by adder 126.

The first digital data stream 212 is processed by concatenated coder 112 into a data stream 218 at 10 Mb/s, while Cartesian-to-polar coordinate converter 124 puts the data into complex symbols 219 at a rate 5 Msymbols/sec. The second digital data stream 213 is processed by Reed-Solomon coder 121 only and then by 122 and 125 to get the data stream 221, which is of the same form as 219. The two data streams are multiplied in multiplier 128 to produce data stream 222, in which the angles of the two components (which represent the actual data) have been added. Data stream. 222 is multiplied by analog amplitudes 216 to produce the final signal 217, a complex symbol stream in which the amplitude represents the analog data, and the 8-valued phase represents the digital data. (If desired, the second digital data stream can also be trellis coded, which produces a 16-PSK nonuniform constellation.) There are several ways to get the desired rf channel signal. One way is to convert data stream 217 into Cartesian coordinates in the data stream 223 by polar-to-Cartesian coordinate converter 129. This gives a signal that can be processed by OFDM coder 103 exactly as in FIG. 6.

Figure 14:
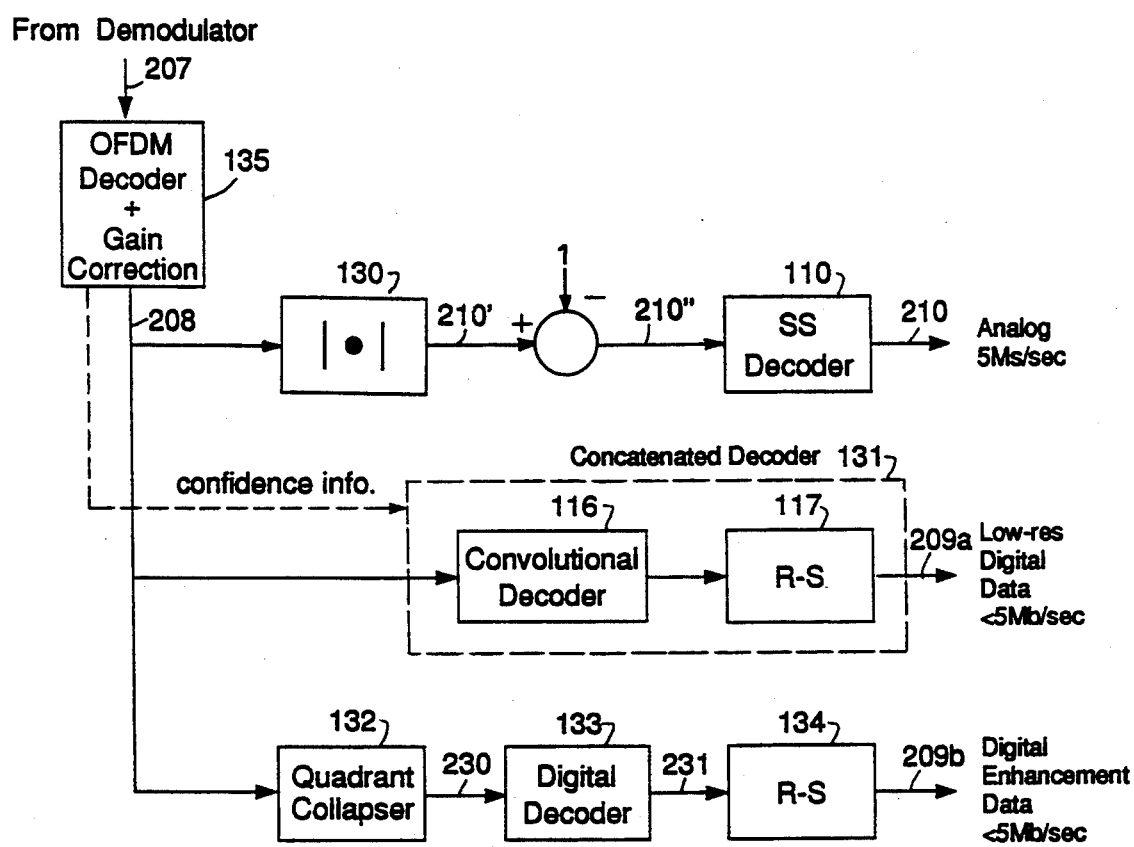
FIG. 14 shows a decoder for decoding a signal encoded by the encoder of FIG. 13

A receiver appropriate to the transmitter of FIG. 13 is shown in FIG. 14. Signal 207 from the demodulator is processed with OFDM decoder including channel estimation and gain correction 135, yielding the complex hybrid symbol stream 208. Note that several of the operations described in FIG. 9 are lumped into the OFDM decoder 135. Because the hybrid PSK constellation allows decoding without reconstructing the FEC codes as in FIG. 9, the details have been lumped into the OFDM decoder. Complex hybrid symbol stream 208 is processed in three separate, parallel data paths, producing 3 distinct classes of data; analog 210, low-resolution digital 209a, and digital enhancement information 209b.

The analog data is recovered by first computing the Euclidean distance of each symbol in complex hybrid symbol stream 208 from the origin using the magnitude operator 130. Since gain correction restores the radial component to its original value (with noise). The analog portion is then decoded by subtracting the center point of the radial component with adder 136. The output 210' is a stream of analog values representing the distance measures from the origin of the symbols in stream 208. Note that this is equivalently viewed as the radial component of the symbol if it were represented in polar coordinates. The SS decoder 110 processes analog data stream 210' to produce analog data 210 at 5Ms/sec.

The low-resolution digital data is recovered by processing complex hybrid symbol stream 208 with the concatenated decoder 131. Note that since gain correction has been performed in OFDM decoder+gain correction 135, the confidence information will take on slightly different meaning in the optimal decoding. However the performance benefit from using the confidence information is exactly the same. Convolutional decoding 116 followed by Reed-Solomon decoding 117 yields low-resolution digital data 209a at <5Mb/sec.

The high-resolution enhancement data is obtained by first processing the complex hybrid symbol stream 208 with the quadrant collapser 132. One implementation of the quadrant collapser is as follows: Analyze the received symbols to see if they are in the first quadrant of the x–y plane. If not, rotate the entire constellation 90 degrees clockwise. Repeat until the constellation point is in the first quadrant. Now, rotate the entire constellation 45 degrees clockwise to produce the output data stream 230.

The digital decoder 133 analyzes data stream 230 and produces digital 1's or 0's in digital data stream 231 depending on the location of the data points above or below the x-axis in the x–y plane. Reed-Solomon decoder 134 then provides a moderate amount of error correction, producing digital enhancement data 209b at <5Mb/sec.

Scrambling

Both the analog and digital data can be scrambled (also called interleaved) before channel encoding at the transmitter, the inverse operations being performed after channel decoding at the receiver. The purpose of this is to spread the effect of impulse noise. Whether this is advantageous for the digital data depends on the details of the error-correction scheme. With Reed-Solomon coding using blocks substantially longer than the likely duration of impulse noise, the effect of a noise impulse is already spread over the entire block. In some cases where the samples that are subjected to R–S coding are in fact multibit words rather than binary digits, a burst error may be entirely contained inside of one word, so that further spreading is undesirable.

Other embodiments are within the following claims.

What is claimed is:

1. An apparatus for encoding a television production signal for transmission, said television production signal comprising a first input signal carrying a first class of data and a second input signal carrying a second class of data, said first input signal being a stream of words, each word of which is N samples wide, wherein N is a positive number, and said second class data requiring a higher-quality transmission than said first class data, said apparatus comprising:

a first stage receiving the first input signal and generating a first output sample stream therefrom; and a second stage receiving said first output sample stream and generating a frequency division multiplex (FDM) output signal therefrom, wherein for each word of said first input signal said first stage generates N serial samples of said first output sample stream, each of said N serial samples being formed by a different combination of a set of more than one of the N samples of said each word.

2. The apparatus of claim 1 wherein said second stage comprises:

an input stage combining said second input signal stream with said first output sample stream to generate an intermediate input sample stream;

a serial-to-parallel converter receiving said intermediate input sample stream and producing a second stream of words therefrom, each of the words of said second stream of words being a parallel grouping of M successive samples of said intermediate input sample stream, wherein M is a positive number;

a Discrete Fourier Transform (DFT) module producing M parallel output streams of symbols that are the discrete Fourier transforms of the samples of the second word stream; and a parallel-to-series converter generating said FDM output signal from the parallel output streams of said DFT module.

3. The apparatus of claim 2 wherein said FDM output signal is equivalent to a sampled version of the sum of P subcarriers of different frequencies, each multiplied by a different sample of said intermediate sample stream, and wherein P is an integer and said P subcarriers are equally spaced throughout a frequency band of a preselected width.

4. The apparatus of claim 3 wherein the television production signal is encoded for transmission over a broadcast channel having a width and exhibiting multipath having a temporal spread and wherein the preselected width is equal to the width of the transmission channel.

5. The apparatus of claim 2 wherein said first input stream is an analog signal and said second input stream is a digital signal.

6. The apparatus of claim 3 wherein the parallel-to-serial converter generates a guard interval in the symbols of the FDM output signal.

7. The apparatus of claim 6 wherein the television production signal is encoded for transmission over a broadcast channel exhibiting multipath having a temporal spread and wherein the guard interval is greater in duration than the temporal spread of the multipath.

8. The apparatus of claim 2 wherein M is greater than about 100.

9. The apparatus of claim 8 wherein M is greater than bout 1000.

10. An apparatus for encoding an input signal for transmission, said input signal comprising a first stream of words, each word of which is N samples wide, N being a positive number, said apparatus comprising:

a first stage receiving the first stream of words and generating a first output sample stream therefrom; and a second stage receiving said first output sample stream and generating a frequency division multiplex (FDM) output signal therefrom, wherein for each word of said first word stream said first stage generates N serial samples of said first output sample stream, each of said N serial samples being formed by a different combination of a set of more than one of the N samples of said each word, and wherein said FDM output signal is equivalent to the sum of P subcarriers of different frequencies, each multiplied by a different sample of said first output sample stream, and wherein P is an integer.

11. The apparatus of claim 10 wherein said second stage comprises:

a serial-to-parallel converter receiving an intermediate input sample stream that is derived from said first output sample stream and producing a second stream of words therefrom; and a processor that receives said second stream of words and produces the FDM output signal therefrom, said serial-to-parallel converter reorganizing said intermediate input sample stream to form the second stream of words, wherein each of the words of said second stream of words is a parallel grouping of M successive samples of said intermediate input sample stream, M being a positive number.

12. The apparatus of claim 11 wherein said second processor comprises a plurality of multipliers and an adder, wherein each of said plurality of multipliers multiplies a different sample of any selected word of said second word stream by a corresponding different one of said P subcarriers to produce a parallel output stream having P components and wherein said adder combines the P components of said parallel output stream to generate said FDM output signal.

13. The apparatus of claim 11 wherein said P subcarriers are equally spaced throughout a preselected frequency range.

14. The apparatus of claim 10 wherein said second stage comprises a Discrete Fourier Transform (DFT) module and a parallel-to-serial converter, wherein said DFT module generates the discrete Fourier transform of said second word stream to produce a parallel output stream and wherein said parallel-to-serial converter generates said FDM output signal from the parallel output stream of said DFT module.

15. The apparatus of claim 14 wherein the subcarriers of said plurality of subcarriers are equally spaced throughout a preselected frequency range.

16. The apparatus of claim 10 wherein said input signal to said apparatus also comprises a second serial input sample stream and wherein said second stage further comprises an input stage combining said second serial input sample stream with said first output sample stream to generate said intermediate input sample stream.

17. The apparatus of claim 16 wherein said input stage comprises:

a first encoder converting the first output sample stream into a first stream of complex samples;

a second encoder converting the second serial input sample stream into a second stream of complex samples; and a combiner that combines the first and second complex sample streams to produce said intermediate input sample stream.

18. The apparatus of claim 16 wherein said input stage comprises a coder coding said second serial input stream before it is combined with said first output sample stream to generate said intermediate input sample stream.

19. The apparatus of claim 18 wherein said coder comprises a Reed-Solomon coder.

20. The apparatus of claim 18 wherein said coder comprises a convolutional coder.

21. The apparatus of claim 18 wherein said coder comprises a Reed-Solomon coder concatenated with a convolutional coder.

22. The apparatus of claim 16 wherein said first serial input sample stream carries a first class of data and said second serial input sample stream carries a second class of data and wherein said second class of data requires a higher transmission quality than said first class of data.

23. The apparatus of claim 16 wherein said first serial input sample stream is an analog signal and said second serial input sample stream is a digital signal.

24. The apparatus of claim 10 wherein said first stage comprises:

a pseudorandom sequence generator generating a plurality of pseudorandom sequences;

a plurality of multipliers, each of which multiplies each sample of said each word by a different one of said plurality of pseudorandom sequences to produce a plurality of spread spectrum signals; and a combiner combining said plurality of spread spectrum signals to form said first output sample stream.

25. The apparatus of claim 24 wherein said plurality of pseudorandom sequences is a plurality of orthogonal pseudorandom sequences.

26. The apparatus of claim 25 wherein there are N pseudorandom sequences in said plurality of pseudorandom sequences and N is an integral multiple of P, the number of subcarriers.

27. The apparatus of claim 26 wherein N equals P.

28. An apparatus for decoding a received frequency division multiplex (FDM) signal to extract data or information from which said FDM signal is derived, said apparatus comprising:

a first stage receiving and decoding said received FDM signal to generate a stream of decoded samples; and a second stage receiving the stream of decoded samples and generating a first output signal therefrom, said first output signal representing a portion of the data or information from which the FDM signal was derived, said first stage comprising an FDM decoder that generates a plurality of demultiplexed signal streams from said received FDM signal, each stream of said plurality of demultiplexed signal streams equivalent to the received FDM signal multiplied by a different one of a plurality of subcarriers and integrated over time and wherein said stream of decoded samples is derived from said plurality of demultiplexed signal streams; and said second stage comprising a spread spectrum demodulator that multiplies a first intermediate sample stream by each of M pseudorandom sequences and integrates over time to produce M second sample streams therefrom, wherein said first intermediate sample stream is derived from said stream of decoded samples and said first output signal is derived from the M second sample streams, M being a positive number.

29. The decoding apparatus of claim 28 wherein said second stage comprises an input stage that receives said stream of decoded samples and extracts said first intermediate sample stream and a second output signal therefrom, said second output signal representing a high frequency portion of the data or information from which the FDM signal was derived and said first intermediate sample stream carrying a low frequency portion of the data or information from which the FDM signal was derived.

30. The decoding apparatus of claim 29 wherein said input stage comprises a quantizer quantizing said stream of decoded samples to generate a quantized signal from which said second output signal is derived and a subtractor subtracting said quantized signal from said stream of decoded samples to generate said first intermediate sample stream.

31. The decoding apparatus of claim 28 wherein said FDM decoder comprises:
 a plurality of multipliers, each one multiplying said FDM signal by a different one of said plurality of subcarriers to produce a plurality of demodulated signals; and
 a plurality of integrators, each one integrating a different one of said plurality of demodulated signals over time to produce a different one of a plurality of demodulated sample steams,
 wherein said first stage further comprises a parallel-to-serial converter converting the plurality of demodulated sample streams into said decoded sample stream.

32. The decoding apparatus of claim 31 wherein said FDM decoder comprises:
 a first serial-to-parallel converter organizing said received FDM signal into a first stream of words, each of which is N samples wide, N being a positive number;
 an inverse Discrete Fourier Transform (IDFT) module performing an inverse discrete Fourier transform on said first stream of words to produce second stream of words; and
 a parallel-to-serial converter converting the second stream of words into said decoded sample stream.

33. The decoding apparatus of claim 28 wherein said spread spectrum demodulator comprises:
 a serial-to-parallel converter that produces M versions of the first intermediate sample stream;
 a pseudorandom sequence generator generating M pseudorandom sequences;
 M multipliers, each receiving a different one of the M versions of the first intermediate sample stream and multiplying it by a different one of said M pseudorandom sequences to produce a different one of M product signals;
 M integrators, each integrating a different one of said M product signals over time to produce the M second sample streams; and
 a parallel-to-serial converter producing said first output stream from the M second sample streams.

34. A television transmission system for encoding a television production signal for transmission, the television production signal comprising a first input signal and a second input signal, said second input signal representing data that requires a higher quality transmission than data associated with said first input stream, said television system comprising:
 a first stage, a second stage, and a transmitter,
 said first stage comprising a first converter generating a first plurality of signal components from said first input signal, a spread spectrum modulator producing a plurality of spread spectrum signals from said plurality of signal components, and a combiner combining said plurality of spread spectrum signals to produce a first output signal stream;
 said second stage comprising an input stage combining said first output signal stream with said second input signal to produce an intermediate input signal, a second converter generating a second plurality of signal components from said intermediate input signal, a frequency division multiplex (FDM) modulator that produces an FDM output signal from said second plurality of signal components, said FDM output signal being equivalent to the sum of a plurality of subcarriers of different frequencies, each multiplied by one of the signal components of said second plurality of signal components,
 said transmitter stage receiving the FDM output signal and generating a television transmission signal therefrom.

35. A method of encoding a television production signal for transmission, the TV production signal comprising a first input signal and a second input signal, said first input signal representing data from a first class and second input signal representing data from a second class, said second class data requiring a higher-quality transmission than said first class data, said method comprising:
 combining said first and second signals to form a complex symbol stream, the amplitude of said complex symbol stream being derived from said first input signal and the phase of said complex symbol stream being derived from said second input signal, and
 modulating at least one carrier signal with said complex symbol stream.

36. The method as in claim 35 wherein said first and second input signals are in analog form and digital form, respectively.

37. The method as in claim 36 wherein the amplitude of said complex symbol stream is equal to a constant plus the amplitude of said first input signal.

38. The method as in claim 36 wherein the phase of said complex symbol stream is a digitally coded version of said second input signal.

39. The method as in claim 35 further comprising orthogonal frequency division multiplex (OFDM) encoding the complex symbol stream prior to modulating said at least one carrier.

40. The method of claim 39 further comprising transforming the complex symbol stream into Cartesian components before OFDM encoding.

41. The method of claim 35 further comprising subjecting said first input signal to a spread-spectrum operation before combining said first and second input signals to form said complex symbol stream.

42. A method of decoding a received television signal that is made available in the form of a complex symbol stream in which a first class of data and a second class of data are encoded, said method comprising:
 determining an amplitude of the complex signal stream, said amplitude representing the first class of data; and
 extracting phase information from said complex symbol stream, wherein said phase information represents said second class of data,
 wherein said second class data requires a higher-quality transmission than said first class data.

43. An apparatus for encoding an input signal for transmission, said input signal comprising a first stream of words, each word of which is N samples wide, N being a positive number, said apparatus comprising:

a first stage receiving the first stream of words and generating a first output sample stream therefrom; and a second stage receiving said first output sample stream and generating a frequency division multiplex (FDM) output signal therefrom, wherein for each word of said first stream of words said first stage generates N serial samples of said first output sample stream, each of said N serial samples being formed by a different combination of a set of more than one of the N samples of said each word, and wherein said second stage comprises a Discrete Fourier Transform (DFT) module and a parallel-to-serial converter, wherein said DFT module produces a parallel output stream by generating the discrete Fourier transform of a second word stream that is derived from said first output sample stream and wherein said parallel-to-serial converter generates said FDM output signal from the parallel output stream of said DFT module.

44. The apparatus of claim 43 wherein said input signal to said apparatus also comprises a serial input sample stream and wherein said second stage further comprises an input stage combining said serial input sample stream with said first output sample stream to generate said intermediate input sample stream.

45. The apparatus of claim 44 wherein said input stage comprises:

a first encoder converting the first output sample stream into a first stream of complex samples;

a second encoder converting the serial input sample stream into a second stream of complex samples; and a combiner that combines the first and second complex sample streams to produce said intermediate input sample stream.

46. The apparatus of claim 44 wherein said input stage comprises a coder coding said serial input stream before it is combined with said first output sample stream to generate said intermediate input sample stream.

47. The apparatus of claim 46 wherein said coder comprises a Reed-Solomon coder.

48. The apparatus of claim 46 wherein said coder comprises a convolutional coder.

49. The apparatus of claim 46 wherein said coder comprises a Reed-Solomon coder concatenated with a convolutional coder.

50. The apparatus of claim 46 wherein said first stream of words carries a first class of data and said serial input sample stream carries a second class of data and wherein said second class of data requires a higher transmission quality than said first class of data.

51. The apparatus of claim 43 wherein said first serial input sample stream is an analog signal and said second serial input sample stream is a digital signal.

52. An apparatus for decoding a received frequency division multiplex (FDM) signal to extract a version of a television production signal from which said FDM signal was derived, said apparatus comprising:

a first stage receiving and decoding said received FDM signal to generate a stream of decoded samples; and a second stage receiving the stream of decoded samples and generating a first output signal therefrom, said first output signal representing a first part of the extracted version of the television production signal from which the FDM signal was derived, said first stage comprising an FDM decoder that generates a plurality of demultiplexed signal streams from said received FDM signal, each stream of said plurality of demultiplexed signal streams equivalent to the received FDM signal multiplied by a different one of a plurality of subcarriers and integrated over time and wherein said stream of decoded samples is derived from said plurality of demultiplexed signal streams; and said second stage comprising:

an input stage that receives said stream of decoded samples and extracts a first intermediate sample stream and a second output signal therefrom, said second output signal representing a second part of the extracted version of the television production signal from which the FDM signal was derived;

a spread spectrum demodulator that multiplies said first intermediate sample stream by each of M pseudorandom sequences and integrates over time to produce M second sample streams therefrom, wherein said first output signal is derived from the M second sample streams, M being a positive number, wherein said second part of extracted version of the television production signal required a higher-quality transmission than said first part.

53. The decoding apparatus of claim 52 wherein said input stage comprises a quantizer quantizing said stream of decoded samples to generate a quantized signal from which said second output signal is derived and a subtractor subtracting said quantized signal from said stream of decoded samples to generate said first intermediate sample stream.

* * * * *

UNITED STATES PATENT AND TRADEMARK OFFICE
CERTIFICATE OF CORRECTION

PATENT NO. : 5,425,050

DATED : June 13, 1995

INVENTOR(S) : William F. Schreiber and Michael O. Polley

It is certified that error appears in the above-identified patent and that said Letters Patent is hereby corrected as shown below:

On the Title page, Abstract;

Line 21, replace "series" with --serial--.

Col. 5, line 64, replace ".." with --.--.

Col. 9, line 61, after "data", insert --:--.

Col. 10, line 43, after "data", insert --:--.

Col. 11, line 35, after "codes", insert --:--.

Col. 12, line 53, after "20i", insert --,--.

Col. 13, line 57, after "version", insert --:--.

UNITED STATES PATENT AND TRADEMARK OFFICE
CERTIFICATE OF CORRECTION

PATENT NO. : 5,425,050

DATED : June 13, 1995

INVENTOR(S) : William F. Schreiber and Michael O. Polley

It is certified that error appears in the above-identified patent and that said Letters Patent is hereby corrected as shown below:

Col. 14, line 18, after "operation", insert --:--.

Col. 15, line 46, after "constellations", insert --:--.

Col. 17, line 41, after "scrambling", insert --:--.

Col. 18, claim 2, line 25, replace "series" with --serial--.

Col. 18, claim 9, line 55, replace "bout" with --about--.

Signed and Sealed this

Ninth Day of July, 1996

Attest:

BRUCE LEHMAN

Attesting Officer  Commissioner of Patents and Trademarks